US009780954B2

(12) United States Patent
Bhattacharya et al.

(10) Patent No.: US 9,780,954 B2
(45) Date of Patent: Oct. 3, 2017

(54) COMPUTER IMPLEMENTED SYSTEM AND METHOD FOR LIGHTWEIGHT AUTHENTICATION ON DATAGRAM TRANSPORT FOR INTERNET OF THINGS

(71) Applicant: Tata Consultancy Services Ltd., Maharashtra (IN)

(72) Inventors: Abhijan Bhattacharya, West Bengal (IN); Soma Bandyopadhyay, West Bengal (IN); Arijit Ukil, West Bengal (IN); Arpan Pal, West Bengal (IN)

(73) Assignee: TATA CONSULTANCY SERVICES LTD., Mumbai, Maharashtra (IN)

( * ) Notice: Subject to any disclaimer, the term of this patent is extended or adjusted under 35 U.S.C. 154(b) by 294 days.

(21) Appl. No.: 14/573,755

(22) Filed: Dec. 17, 2014

(65) Prior Publication Data
US 2015/0222439 A1    Aug. 6, 2015

(30) Foreign Application Priority Data
Feb. 3, 2014    (IN) .......................... 377/MUM/2014

(51) Int. Cl.
*H04L 9/32*      (2006.01)
*H04L 9/08*      (2006.01)
(Continued)

(52) U.S. Cl.
CPC .......... *H04L 9/3273* (2013.01); *H04L 9/0869* (2013.01); *H04L 63/0869* (2013.01);
(Continued)

(58) Field of Classification Search
CPC . H04L 63/0869; H04L 63/166; H04L 9/0844; H04L 9/3273; H04L 9/321;
(Continued)

(56) References Cited

U.S. PATENT DOCUMENTS

| 6,377,691 B1 * | 4/2002 | Swift ...................... H04L 63/04 380/277 |
| 7,424,615 B1 * | 9/2008 | Jalbert .................. H04L 9/3273 380/283 |

(Continued)

FOREIGN PATENT DOCUMENTS

| CA | 2276278 A1 * | 1/2011 | ............ H04W 12/06 |
| WO | 01/13201 A2 | 2/2001 | |
| WO | 2013/014609 A1 | 1/2013 | |

OTHER PUBLICATIONS

Raza, Lightweight Secure CoAP for the Internet of Things, Oct. 2013, IEEE Sensors Journal, vol. 13 No. 10, pp. 3711-3720.*

*Primary Examiner* — Farid Homayounmehr
*Assistant Examiner* — Lizbeth Torres-Diaz
(74) *Attorney, Agent, or Firm* — Westman, Champlin & Koehler, P.A.

(57) ABSTRACT

A computer implemented system and method for lightweight authentication on datagram transport for internet of things provides a robust authentication scheme based on challenge-response type of exchanges between two endpoints sharing a pre-shared secret. A symmetric key-based security mechanism is utilized in the present disclosure where key management is integrated with authentication. It provides mutual authentication wherein the end-points in the system are provisioned with a pre-shared secret during a provisioning phase and a client database is provided at the server side for client identification. The system comprises random number generators for generation of nonces, and key generators to generate secret key and session key. The nonces and keys are valid only during the session and thus help in providing secure authentication across sessions.

The system can be further adapted on transport layer security protocols like DTLS and can be integrated with application layer protocols like CoAP for constrained devices.

18 Claims, 8 Drawing Sheets

(51) Int. Cl.
  *H04L 29/06* (2006.01)
  *H04W 4/00* (2009.01)
  *H04L 29/08* (2006.01)
  *H04L 9/06* (2006.01)

(52) U.S. Cl.
  CPC ............ *H04L 67/12* (2013.01); *H04W 4/005* (2013.01); *H04L 9/0637* (2013.01); *H04L 63/166* (2013.01); *H04L 2209/805* (2013.01)

(58) Field of Classification Search
  CPC ... H04L 9/0869; H04L 9/3247; H04L 9/3249; G06F 2221/2103; G06F 21/445
  See application file for complete search history.

(56) References Cited

U.S. PATENT DOCUMENTS

| | | | |
|---|---|---|---|
| 8,281,134 B2 | 10/2012 | Bajic et al. | |
| 2003/0093680 A1* | 5/2003 | Astley | G06F 21/445 713/183 |
| 2003/0221126 A1* | 11/2003 | Berman | H04L 63/0823 726/14 |
| 2007/0300070 A1* | 12/2007 | Shen-Orr | G06F 21/33 713/176 |
| 2009/0271462 A1* | 10/2009 | Schneider | G06F 21/34 708/250 |

\* cited by examiner

COMPUTER IMPLEMENTED SYSTEM AND METHOD FOR LIGHTWEIGHT AUTHENTICATION ON DATAGRAM TRANSPORT FOR INTERNET OF THINGS

CROSS-REFERENCE TO RELATED APPLICATION

This Application is a non-provisional Application of Indian Application No. 377/MUM/2014, filed Feb. 3, 2014, in English, the contents of which are hereby incorporated by reference in their entirety.

FIELD OF DISCLOSURE

The present disclosure relates to authentication and security for Internet of Things.

DEFINITIONS OF TERMS USED IN THE SPECIFICATION

The expression 'IoT' used hereinafter in this specification refers to Internet of Things wherein uniquely identifiable objects are represented in an Internet-like structure.

The expression 'M2M' used hereinafter in this specification refers to Machine to Machine communication technologies that allow both wireless and wired systems to communicate amongst each other over a network comprising heterogeneous nodes.

The expression 'nonce' used hereinafter in this specification refers to a random number that is used only once.

The expression 'datagram transport' used hereinafter in this specification refers to a connectionless transport protocol, an exemplary and popular implementation of which is User Datagram Protocol (UDP).

The expression 'provisioning phase' used hereinafter in this specification refers to the process of preparing and equipping the client side and server side before communication. It includes steps like embedding a pre-shared-secret.

The expression 'session initiator' used hereinafter in this specification refers to a device that initiates a session by sending an initial 'HELLO' message to the server.

These definitions are in addition to those expressed in the art.

BACKGROUND

IoT/M2M comprises physical entities; identities or states of which can be exchanged over the Internet infrastructure. M2M may be considered as a subset of the IoT. A pattern in which the data is transferred on an M2M driven IoT is different from the conventional Internet in terms of data traffic model and number of participating nodes. M2M deals with much more nodes than conventional human to human (H2H) kind of interaction over Internet.

IoT/M2M systems usually consist of constrained devices like sensors that allow communication over wireless and/or wired networks. Usually this wireless communication network is also constrained in terms of bandwidth. Deploying a robust as well as low overhead secure means of communication with authentication in such constrained domain is a challenge. Conventional robust certificate based schemes for constrained devices that use public key cryptosystem may prove too costly due to the processing, energy and bandwidth requirements involved. Additionally, if Security at the IP layer, for e.g., IPSec is considered, it is suboptimal in terms of resource usage and maintenance. Also, Transport layer security scheme like TLS, is not applicable for its resource requirements even though it is very robust, because, it may prove to be costly for constrained devices.

Constrained Application Protocol (CoAP) is an exemplary network application layer protocol that allows interactive communication between constrained devices over the Internet in a RESTful manner. CoAP from Internet Engineering Task Force (IETF) is primarily designed to run on User Datagram Protocol (UDP) to create a lightweight solution and proposes Datagram Transport Layer Security (DTLS) as a security layer solution for IoT/M2M. However, DTLS with a full blown certificate based public key infrastructure (PKI) is not optimal for constrained devices. So, a pre-shared key (PSK) mode of DTLS is defined as a lightweight alternative for constrained devices. Such a scheme, though lightweight, sacrifices robustness. It also lacks authentication of end-points.

In CoAP, DTLS uses the cookie exchange technique to mitigate Denial of Service (DoS) attack where a ClientHello message is sent by an attacker to launch an amplification attack. Particularly, in the PSK mode, the client computes a Pre-Master Secret and Master Secret, from the pre-shared key and then sends a ClientKeyExchange message to the server containing a psk_identity that is used by the server to lookup the required pre-shared key. However, a cookie exchange in plain text is not robust. Also, the cookie exchange mechanism adds to the connection establishment overhead which prove costly for constrained environments.

Accordingly, it is evident that there is a definite white space in terms of a robust authenticated yet lightweight secured system usable in the constrained space of IoT/M2M. Additionally, there is also need for a system and method that is generic in catering to the authentication requirement of general networking/communication systems.

OBJECTS

An object of the system of the present disclosure is to provide a system that is robust yet lightweight in mutually authenticating the endpoints in a typical constrained IoT/M2M environment.

Another object of the system of the present disclosure is to provide a system that uses lightweight pre-shared secret mode of security scheme in terms of using less number of handshaking messages.

Still another object of the system of the present disclosure is to provide a system that is generic to cater to the authentication requirement of general networking/communication systems.

One more object of the system of the present disclosure is to provide a system that allows payload-embedded authentication and key management initiated by a client using symmetric encryption.

Yet another object of the system of the present disclosure is to provide a system that can be integrated with the transport layer security schemes like DTLS to reinforce existing DTLS scheme as well as make it more lightweight by reducing the number of exchanges.

An additional object of the system of the present disclosure is to provide a system that can be integrated with the application layer like CoAP for constrained devices with incorporation of new header option.

Other objects and advantages of the present disclosure will be more apparent from the following description when read in conjunction with the accompanying figures, which are not intended to limit the scope of the present disclosure.

SUMMARY

The present disclosure envisages a computer implemented system for two way authentication on datagram transport between a server and a client.

Typically, in accordance with the present disclosure, the computer implemented system for two way authentication on datagram transport between a server and a client includes a system processor and comprises a first random number generator that cooperates with the system processor to generate a first random number. A second random number generator included in the system also cooperates with the system processor to generate a second random number. The system comprises a secret key generator which cooperates with the system processor and is configured to generate and transmit, under generation commands and transmitting commands of the system processor, a secret key to the server and the client prior to two way authentication during a provisioning phase. A first repository present in the system is configured to store client IDs of all the clients. The system also comprises a session initiator configured to transmit from the client to the server, under transmitting commands of the system processor, a first message comprising client's unique ID. A receiver cooperates with the system processor to receive the first message under receiving commands of the system processor and is equipped with a matching engine to match the received client ID with the stored client ID from the first repository to identify a client. A session key generator is configured to generate a uniquely time bound and limitedly valid session key and transmit the generated session key under transmitting commands of the system processor. The system further comprises a challenge code generator that cooperates with the system processor and is configured to receive the session key and, generate under generation commands of the system processor and transmit under transmitting commands of the system processor, a challenge code comprising the first random number generated by the first random number generator and the session key. A first encrypter present in the system cooperates with the challenge code generator to receive the generated challenge code from the challenge code generator and encrypt in response to the commands form the system processor, the received generated challenge code with the secret key generated by the secret key generator and further configured to transmit under transmitting commands from the system processor, the encrypted challenge code to the identified client. A first decrypter cooperates with the system processor and is configured to receive the encrypted challenge code and is further configured to decrypt in response to the commands form the system processor, the encrypted challenge code with the secret key generated by the secret key generator to obtain decrypted first random number and session key. The system further comprises a second repository configured to receive and store the session key from the first decrypter. A second encrypter present in the system cooperates with the system processor and is configured to receive the decrypted first random number and session key and, further configured to transmit under transmitting commands of the system processor, a second message containing the decrypted first random number and the second random number generated by the second random number generator encrypted with the session key. The system also comprises a second decrypter that cooperates with the system processor and is configured to receive the second message and decrypt, in response to the commands from the system processor, the first random number and the second random number using the session key generated by the session key generator. A first comparator and authenticator present in the system is configured to compare in response to the commands from the system processor, the decrypted first random number from the second message with the first random number generated by the first random number generator thereby authenticating the client. The system comprises a third encrypter configured to encrypt, in response to the commands from the system processor, the second random number received in the second message with the session key generated by the session key generator and transmit under transmitting commands of the system processor, the encrypted second random number. A third decrypter is configured to receive under receiving commands of the system processor, and further configured to decrypt the encrypted second random number with the session key received from the second repository in response to the commands from the system processor. A second comparator and authenticator is configured to compare, in response to the commands from the system processor, the decrypted second random number with the second random number generated by the second random number generator thereby authenticating the server and achieving mutual authentication.

In accordance with the present invention, there is provided a computer implemented method for two way authentication on datagram transport between a server and a client, the method includes system processing commands and comprises:

generating a first random number (nonce_1) with the help of a first random number generator;

generating a second random number with the help of a second random number generator (nonce_2);

generating a secret key in response to the system processing commands with the help of a secret key generator;

transmitting in response to the system processing commands, the generated secret key to the server and the client prior to two way authentication during the provisioning phase;

storing client IDs of all the clients in a first repository;

transmitting in response to the system processing commands, a first message comprising client's unique ID;

receiving in response to the system processing commands, the first message and matching the received client ID with the stored client ID from the first repository;

identifying the client based on the received client ID;

generating a uniquely time bound and limitedly valid session key with the help of a session key generator;

receiving the session key and generating under system processing commands, a challenge code comprising the first random number generated by the first random number generator and the session key;

receiving the generated challenge code from the challenge code generator and encrypting in response to the system processing commands with the help of a first encrypter the received generated challenge code with the secret key generated by the secret key generator and transmitting in response to the system processing commands, the encrypted challenge code;

receiving the encrypted challenge code and decrypting in response to the system processing commands, the encrypted challenge code with the secret key generated by the secret key generator with the help of a first decrypter to obtain the first random number and the session key;

receiving from the first decrypter the session key and storing in a second repository;

receiving in response to the system processing commands, the decrypted first random number and session key and transmitting a second message encrypted with the session key containing the decrypted first random number and the second random number generated by the second random number generator;

receiving in response to the system processing commands, the second message and decrypting the first random number and the second random number using the session key generated by the session key generator;

comparing in response to the system processing commands, the decrypted first random number from the second message with the first random number generated by the first random number generator;

authenticating under the system processing commands, the client if the decrypted first random number matches with the generated first random number;

encrypting in response to the system processing commands, the second random number received in the second message with the session key generated by the session key generator and transmitting the encrypted second random number;

receiving and decrypting in response to the system processing commands, the encrypted second random number with the session key received from the second repository;

comparing the decrypted second random number with the second random number generated by the second random number generator in response to the system processing commands; and authenticating in response to the system processing commands, the server to achieve mutual authentication if the decrypted second random number matches with the generated second random number.

BRIEF DESCRIPTION OF ACCOMPANYING DRAWINGS

The system of the present disclosure will now be described with the help of the accompanying drawings, in which.

DETAILED DESCRIPTION OF THE ACCOMPANYING DRAWINGS

The system of the present disclosure will now be described with reference to the embodiment shown in the accompanying drawing. The embodiment does not limit the scope and ambit of the disclosure. The description relates purely to the examples and preferred embodiments of the disclosed system and its suggested applications.

The system herein and the various features and advantageous details thereof are explained with reference to the non-limiting embodiments in the following description. Descriptions of well-known parameters and processing techniques are omitted so as to not unnecessarily obscure the embodiment herein. The examples used herein are intended merely to facilitate an understanding of ways in which the embodiment herein may be practiced and to further enable those of skill in the art to practice the embodiment herein. Accordingly, the examples should not be construed as limiting the scope of the embodiment herein.

In accordance with the present disclosure, the system provides a lightweight and robust authentication scheme based on a challenge-response type of exchanges between two endpoints sharing a pre-shared secret. The proposed security solution is a symmetric key based security mechanism where key management is integrated with authentication. It provides a two way authentication on datagram transport between a server and a client and is suitable for IoT/M2M.

The system of present disclosure provides mutual authentication with low overhead. To achieve the mutual authentication, end-points in the system are provisioned with a pre-shared secret during a provisioning phase and a client database is provided at the server side for client identification. The system also includes a pseudo random number (PRN) module and a timer (system time) for generation of nonces, and a server key generation module. The nonces and key help in providing secure authentication. Challenge messages are generated from both server and client side during the authentication process. AES encryption and decryption is used at the client and server side.

The system of the present disclosure can be further adapted on transport layer security protocols like DTLS using PSK mode. The steps for adaptation involve establishing authentication session using encrypted nonce based challenge response on top of DTLS and establishing a secure channel for the use.

Figure 1:
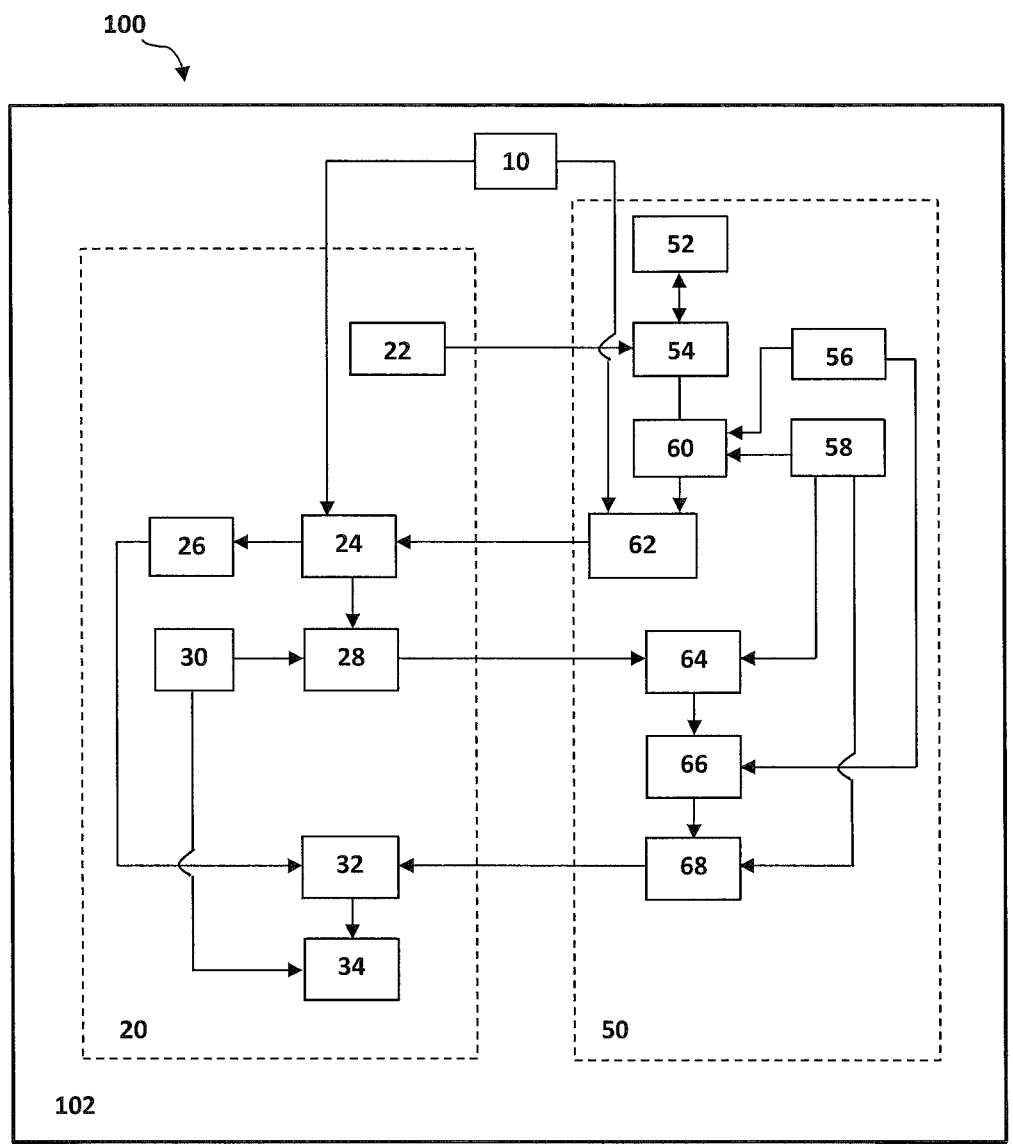
FIG. 1 illustrates the schematic of the system that provides mutual authentication between a server and a client.

Referring to the accompanying drawings, FIG. 1 illustrates the schematic of the system 100 that provides mutual authentication between a server 50 and a client 20 based on commands of a system processor 102. The system 100 of the present disclosure proposes an authentication scheme based on challenge-response kind of exchanges between two endpoints sharing a pre-shared secret. This pre-shared secret is generated by a secret key generator 10 based on generation commands from the system processor 102. The security solution of the present disclosure is a symmetric key based security mechanism where key management is integrated with authentication. During a provisioning phase the end-points are configured with the pre-shared secret. A session initiator 22 at the client 20 initiates a session by sending the server 50 a HELLO message using an identifier (ID) unique to the client. A receiver 54 at the server 50 receives the message based on receiving commands from the system processor 102 and first looks up the ID in the preconfigured repository 52 which stores all client IDs. However, to prevent spoofing by a malicious client the server 50 generates a challenge code with the help of a challenge code generator 60. This challenge code comprises a unique session key 'k' generated by the session key generator 58 and a random number 'nonce1' generated by a first random number generator 56. The session key generator 58 comprises a session key timer (not shown in the figure) that generates session key timer values in order to determine the validity of generated session keys. The session key 'k' is thus revoked based on a session key timer value. Expiration of the session key timer value indicates the revocation of the key and need for a new session establishment with a new session key. The first random number generator 56 comprises a first timer (not shown in the figure) that generates a first timer value. The 'nonce1' which is generated by the first random number generator 56 is a pseudo random number (PRN) appended with this first timer value. The challenge code is then encrypted by a first encrypter 62 by using the pre-shared secret that was generated and shared by the secret key generator 10. This challenge code is sent to the client. A legitimate client 20 is able to decrypt the challenge code through a first decrypter 24 with the help of the secret key shared by the secret key generator 10 and further get the 'nonce1' and the session key 'k' supplied by the server 50. The decrypted session key 'k' is then stored in a second repository 26. Further, in response to the challenge code, the client 20 forms a response message comprising the 'nonce1' received from the server 50 and a 'nonce2' generated by a second random number generator 30 at the client 20. The second random number generator 30 comprises a second timer (not shown in the figure) that generates a second timer value. This second timer value is appended to another pseudo random number (PRN) to form the 'nonce2'. The response message is encrypted by a second encrypter 28 with the session key 'k' that was earlier decrypted using the first decrypter 24. On receiving the response message, a second decrypter 64 at the server 50, decrypts the response from the client 20 and matches the 'nonce1' by using a first comparator and authenticator 66 with its own copy of 'nonce1' from the first random number generator 56. If the two match then the server 50 authenticates the client 20 with the first comparator and authenticator 66 and further sends a message based on the commands from the system processor 102, to the client 20 containing the received 'nonce2' encrypted by session key 'k' with the help of a third encrypter 68. The client decrypts 'nonce2' with the help of a third decrypter 32 by using the session key 'k' stored in the second repository 26. The decrypted 'nonce2' is then matched with the 'nonce2' generated by the second random number generator 30 with the help of a second comparator and authenticator 34. When the decrypted 'nonce2' matches with the client's 20 'nonce2', the server 50 is authenticated by the second comparator and authenticator 66, thus achieving mutual authentication.

The nonce's and keys that are used, change over different sessions. Generated nonces are non-reproducible since they comprise pseudo random numbers (PRNs) appended with timer values from the timers (counters). This provides resistance against the replay attack.

Figure 2:
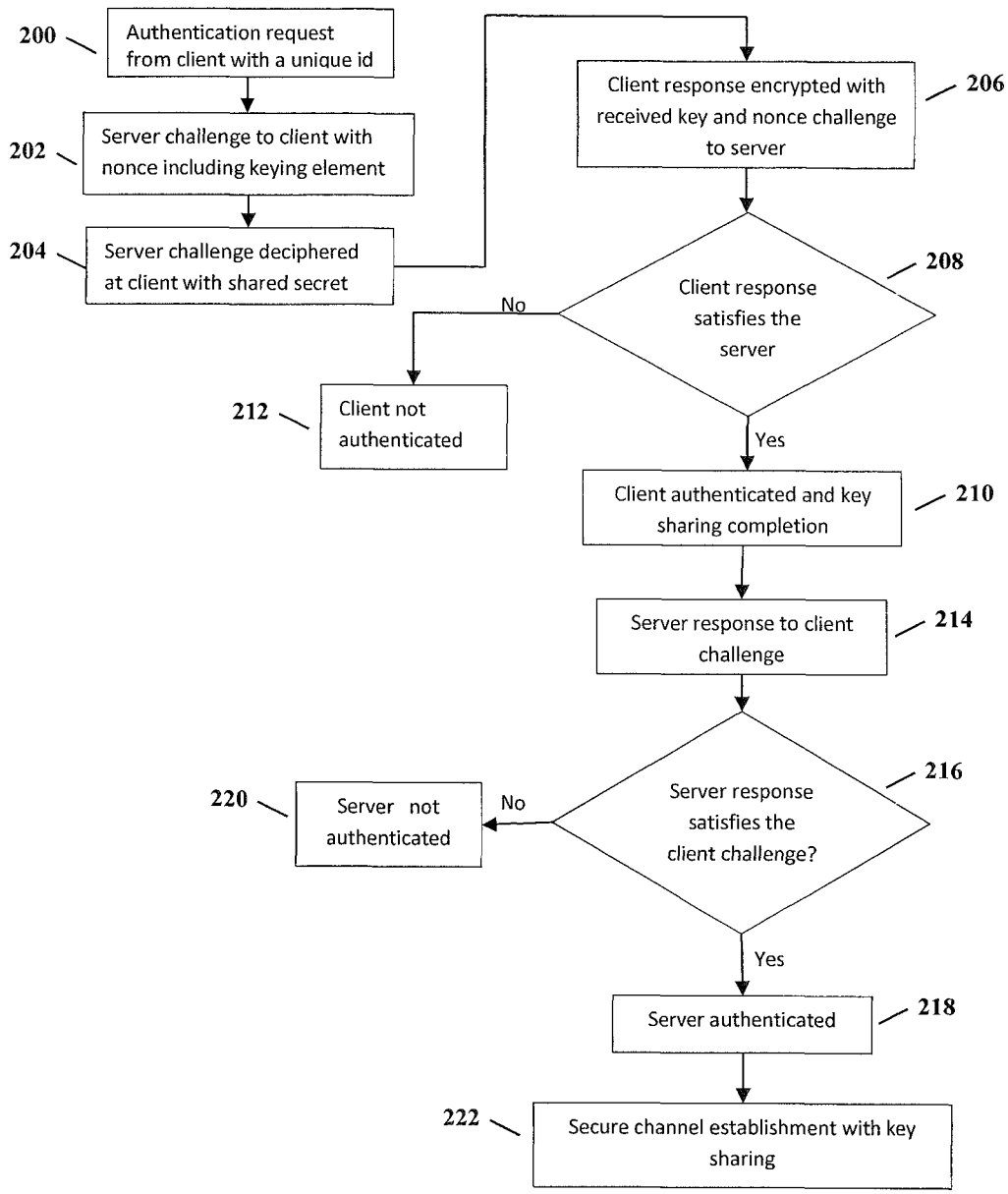
FIG. 2 illustrates the system flow for achieving mutual authentication and a secure communication.

Referring to the accompanying drawings, FIG. 2 illustrates the system flow for achieving mutual authentication and a secure communication. A server and a client are two end-points that are configured with a pre-shared secret (y) during a provisioning phase. After completion of the provisioning phase, the client sends authentication request to the server 200. The session is thus initiated by the client by sending the server a 'HELLO' message along with his unique client ID. After receiving the message, the server looks up the client ID in the preconfigured database. However, to prevent spoofing by a malicious client the server generates a challenge code 202 comprising a unique key (k) and a random nonce (nonce1). The challenge code is encrypted with the pre-shared secret (y) and sent to the client. A legitimate client is able to decrypt the challenge code with the pre-shared secret (y) 204 and get the nonce and the key supplied by the server. In response the client forms a response message that is encrypted with the received unique key (k) and comprises the nonce received from the server (nonce1) and a nonce generated at the client (nonce2) 206. The server decrypts the response from the client and matches the nonce1 with its own copy 208. If the two nonces do not match the client is not authenticated 212. If the two match, the client authentication and key sharing is completed 210. After authenticating the client, the server responds to the client challenge 214 with nonce2 concatenated with k and encrypted by y. At the client side, nonce2 received from the server is matched with client's copy of nonce2 to check if the server response satisfies the client challenge 216. If the client is able to match nonce2 with its own copy then it authenticates the server 218. If the nonces do not match, the server is not authenticated 220. Once the client and the server are both mutually authenticated a secure channel is established between them 222. The nonces and keys used during authentication process change over different sessions. Sessions are getting refreshed by using a timer. The system of the present disclosure includes a pseudo random number generator (PRNG) appended with a timer (counter) to provide unique keys and unique 128 bits nonces during every sessions. A nonce is thus non-reproducible due to randomness of $\mathcal{R}_j$ (PRN) along with monotonic incremental nature of $\mathcal{T}_j$ (timer). $\mathcal{R}_j$ is generated in pseudo-random way and its inclusion with $\mathcal{T}_j$ assures that replay attack is improbable:

$$\{Pr(R_j|_{t=T}=R_j|_{t=T'})=1\}<\epsilon',\epsilon'\to 0.$$

The collision probability of the attack is on the order of $2^{-56}$

The predictable non-reproducibility among nonces is governed by 16 bits $\mathcal{T}_j$ the non-predictable part is governed by $\mathcal{R}_j$.

Figure 3:
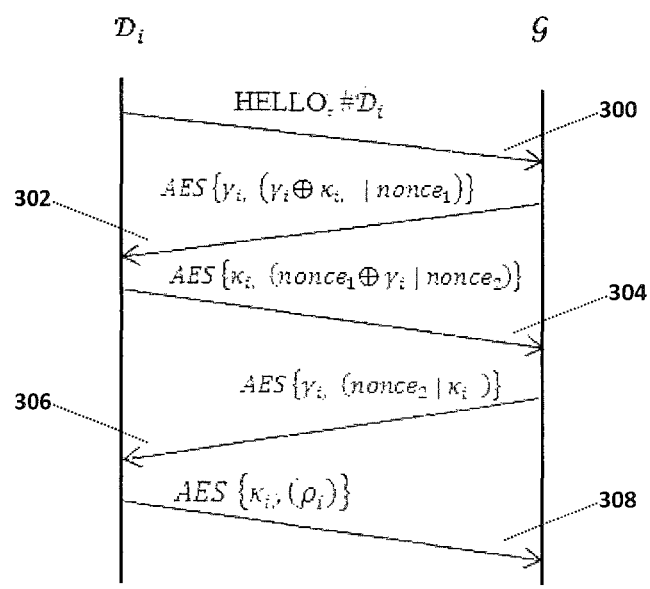
FIG. 3 illustrates the steps involved during a handshake between a server and a client.

Referring to the accompanying drawings, FIG. 3 illustrates the steps involved during a handshake between a server and a client. It depicts a lightweight mutual authentication and key-management algorithm where $\mathcal{D}_i$ represents client and $\mathcal{G}$ represents server. Before the authentication process begins, a secret $\gamma_i=\{0,1\}^{128}$ is shared between $D_i$ and $\mathcal{G}$ offline at the provisioning phase. The authentication process then starts with session initiation where the client $D_i$ sends 'HELLO, #$D_i$' to server $\mathcal{G}$ 300. Here, #$D_i$ is a unique client device ID. Once the session is initiated, the server $\mathcal{G}$ responds by sending a challenge code 'AES $\{\gamma_i, (\gamma_i \oplus \kappa_i | nonce_1)\}$' to the client 302, where $\kappa_i$, $nonce_1=\{0,1\}^{128}$ and message size is 256 bit. Client decrypts the challenge code and responds to the server by sending another challenge code including $nonce_1$ and an additional $nonce_2$. 'AES $\{\kappa_i, (nonce_1 \oplus \gamma_i | nonce_2)\}$' 304 is the client response and challenge. At the server side, the server verifies $nonce_1$ and responds to the client by sending $nonce_2$ encrypted with $\kappa_i$ as 'AES $\{\gamma_i, (nonce_2 | \kappa_i)\}$' 306. Once both client and server side have verified the nonce's and authentication is complete, the client sends data $\rho_i$ to the server as 'AES $\{\kappa_i, (\rho_i)\}$' 308.

Figure 4:
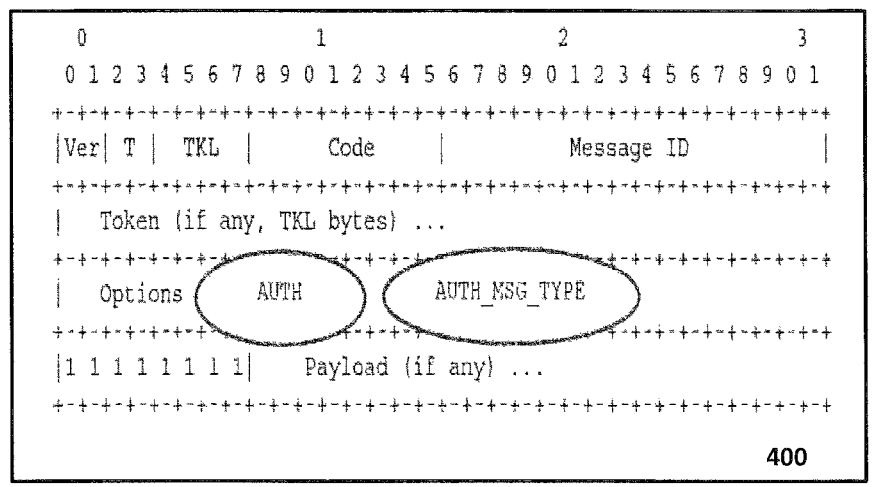
FIG. 4 illustrates the introduced header options in a CoAP message format in order to embed into existing application layer protocol as an exemplary case.
Figure 5:
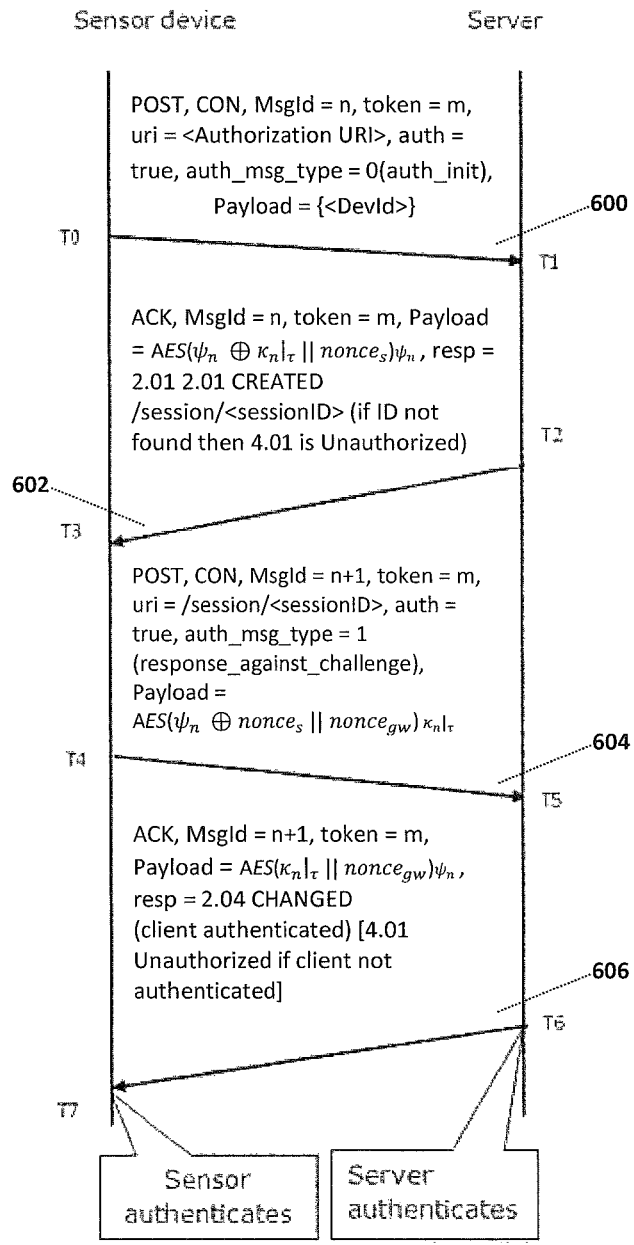
FIG. 5 illustrates exemplary authentication handshaking between a Sensor device (client) and a Server.

Referring to the accompanying drawings, FIG. 4 and FIG. 5 illustrate the modified CoAP message format after embedding system of the present disclosure into existing application layer protocol 400 as an exemplary application of the proposed generic scheme and an exemplary authentication handshaking between a Sensor device (client) and a Server respectively.

A typical interaction model of CoAP is similar to the client/server model of HTTP and is RESTful. But unlike HTTP, CoAP deals asynchronously with interchanges over datagram-oriented transport like UDP. Typically CoAP includes four types of messages: Confirmable, Non-confirmable, Acknowledgement and Reset. These messages carry requests or responses depending on the method or response code.

The authentication scheme disclosed in the present disclosure can be integrated as RESTful payload embedding with CoAP. As it can be observed in FIG. 5, a POST method with confirmable (CON) data transfer mode is applied to achieve mutual authentication between a sensor device (client) and a server. A new field 'AUTH' is introduced in the CoAP header to enable the secure (authentication) mode 400. This field uses an unused option indicating a critical option class. Another option named 'AUTH_MSG_TYPE' is also introduced along with 'AUTH' to indicate different messages for establishing an authentication session.

The option fields in a CoAP header carries optional request/response features in a CoAP message. The fields defined for the present disclosure are as follows:
AUTH: indicates enablement of authentication/disabling authentication mode. A True or False value can be set for this field.
AUTH_MSG_TYPE: this field can either be '0' or '1', where, 0=auth_init and 1='response_against_challenge'

The authentication session when enabled by setting 'AUTH=true' is maintained by using a constant 'Token' value in header for all associated messages exchanged during the authentication phase.

Referring to FIG. 4 and FIG. 5, following steps are performed to embed authentication with CoAP:
At initiation, sensor-gateway sends a POST message in CON mode to a server authorization URI with AUTH option field true with AUTH_MSG_TYPE value as 'auth_init' i.e. '0', and 'device identifier' in the payload 600.
The server derives device identifier from payload and determines pre-shared secret associated with that device-identifier after receiving options 'AUTH', and 'auth_init' value for AUTH_MSG_TYPE. It then generates nonce (nonce_1) and Key (K). Server generates an encrypted payload using shared secret.
Server responds back the client with a response code indicating a new resource has been created. The URI in the response indicates a temporary session ID for the entire handshaking for authentication. In case of an invalid device identifier, server sends a response code 'Unauthorized'. The encrypted payload is either piggybacked or separately sent to the client 602.
The client decrypts response received from server and obtains nonce_1 and X'. It generates the nonce (nonce_2) and then generates encrypted payload by using key X'. It sends this payload using a POST message with option field 'AUTH', and AUTH_MSG_TYPE value as 'response_against_challenge', and with same token value as in last POST message 604.
A key refreshment timer is maintained for refreshing the sessions. (In case of CoAP this value must be greater than MAX_RETRANSMIT_COUNT*MAX_RETRANSMISSION_TIMEOUT)
Server decrypts payload of above POST with above mentioned optional values in header by using 'K' and checks the received nonce. Server sends a response with response code 'Changed' to indicate that a change in the resource was authenticated if nonce is identical with its previous value (generated in step 2), otherwise sends 'Unauthorized' 606.

The notations used with reference to FIG. 5 are as follows:
$\psi_n$: Shared secret between sensor gateway $\delta_n$ and server $S$
$\kappa_{n|\tau}$: Key exchanged between sensor gateway $\delta_n$ and server at $\tau^{th}$ session
$<\delta_n>$: Unique sensor device/gateway ID of $\delta_n$
$AES(.)_\kappa$: AES operation on plaintext using key $\kappa$ $nonce_{i=s_{gw}}$ : $nonce_s$ = server initiatd nonce $nonce_{gw}$ = sensor gateway/client initiated nonce $\omega_n$: Sensor data of sensor gateway $\delta_n$ After authentication phase is over and secure channel is established, the client may optionally communicate in a completely open-loop mode while updating some resources in the server such that the client expresses disinterest in the server's response.

In one embodiment of the system of present disclosure, CoAP is used in a NON (non-reliable) mode and an option field (ex. No-response) is introduced to indicate that the server does not need to respond with the status of the resource execution. Thus resulting in reduced load on the network. The NO-RESPONSE' field value is either '0' or '1', where, 0 indicates that the server needs to respond with the status and 1 indicates that the server need not respond.

Figure 6:
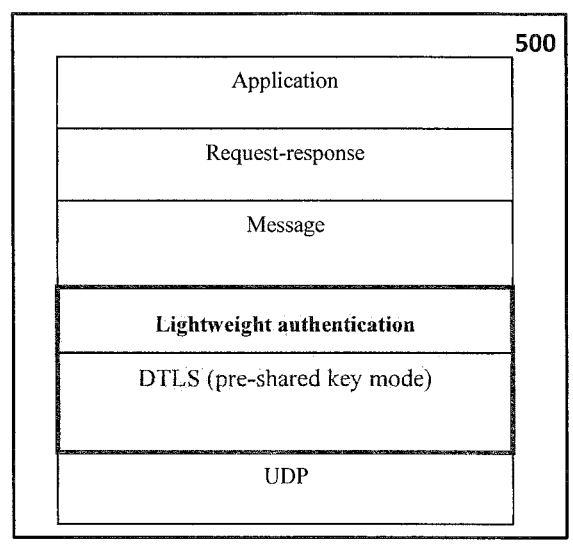
FIG. 6 illustrates the integration of the system of present disclosure as an additional layer for authentication with DTLS like security layer.

Referring to the accompanying drawings, FIG. 6 illustrates the integration of the system of present disclosure as an additional layer for authentication with DTLS like security layer 500.

Figure 7:
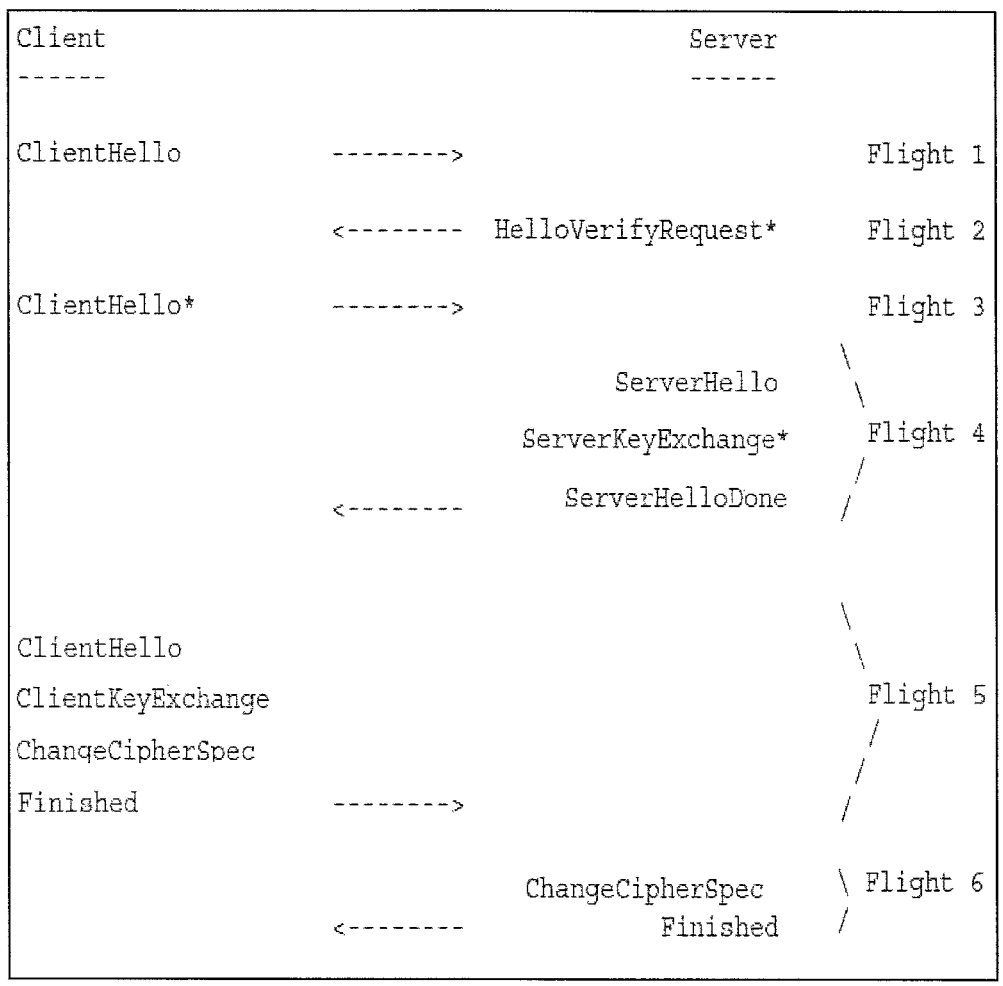
FIG. 7 illustrates timing-diagram of conventional DTLS handshake for secure session initiation with pre-shared key mode (PSK).
Figure 8:
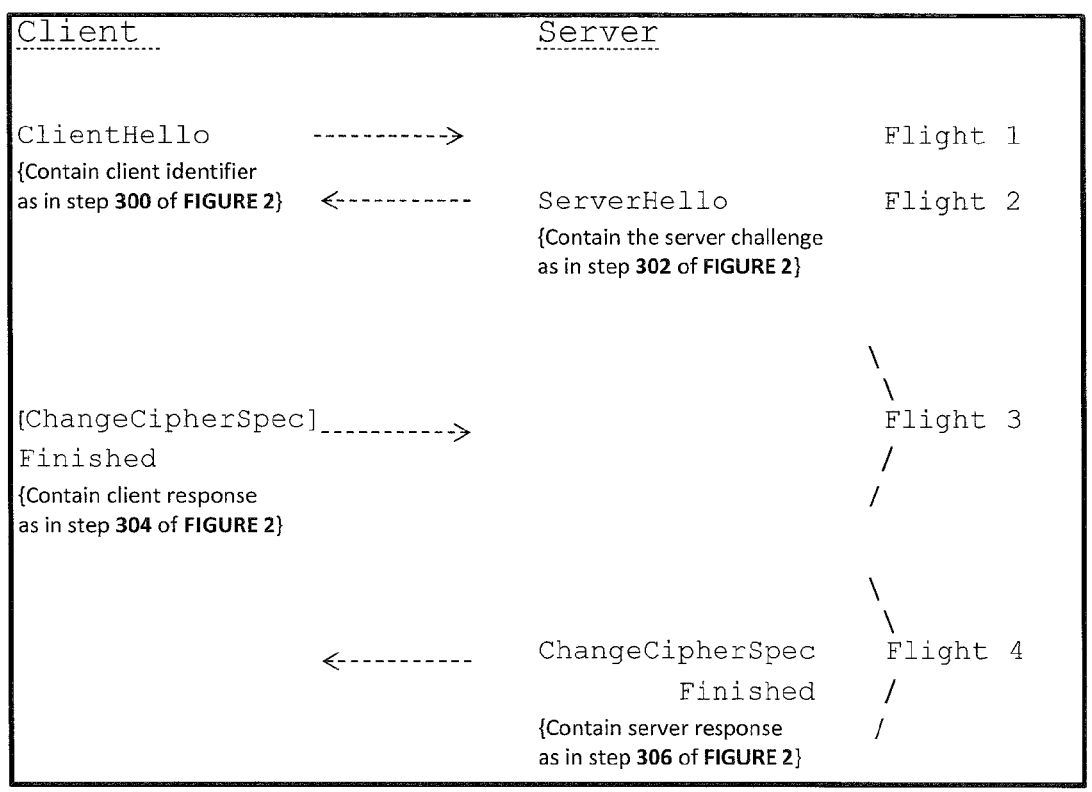
FIG. 8 illustrates modified DTLS handshake with pre-shared secret in accordance with the present disclosure.

Referring to the accompanying drawings, FIG. 7 illustrates timing-diagram of DTLS handshake for secure session initiation with pre-shared key mode (PSK) and FIG. 8 illustrates integration of the method in the present disclosure into the DTLS framework resulting into a modified DTLS handshake with pre-shared secret, along with derived key, prior to establishing a secure connection. Every handshaking message is encrypted either by pre-shared secret or by derived key K. The elements with '*' in FIG. 7 indicates situation dependent messages. FIG. 8 illustrates the mapping between message exchanges and the steps involved during a handshake between a server and a client as denoted in FIG. 3. With reference to FIG. 7 and FIG. 8, it is concluded that the system of the present disclosure reduces the number of handshakes to 4 handshakes from the conventional 6 handshakes.

Technical Advancements

A computer implemented system and method for lightweight authentication on datagram transport in accordance with the present disclosure described herein above has several technical advancements including but not limited to the realization of:
a system that reduces overhead due to payload embedded symmetric key based authentication and integrated key management with a session key refreshment timer;
a system that is ideal for securing resource constrained sensor devices;

a system that can be integrated with the transport layer security schemes like DTLS to reinforce existing DTLS scheme as well as make it more lightweight by reducing the number of exchanges;

a system that can adapt application protocol as a payload embedded authentication scheme;

a system that can be integrated with the application layer like CoAP for constrained devices;

a system that allows open-loop communication of CoAP by introducing new header option with the application layer protocol to optimize resource usage after authentication is achieved; and a system that is generic to cater to the authentication requirement of general networking/communication systems.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A computer implemented system for two way authentication on datagram transport between a server and a client, said system including a system processor and comprising:

a first random number generator cooperating with the system processor and configured to generate a first random number;

a second random number generator cooperating with the system processor and configured to generate a second random number;

a secret key generator cooperating with the system processor and configured to generate and transmit under generation commands and transmitting commands of the system processor, a secret key to the server and the client prior to two way authentication during a provisioning phase;

a session initiator configured to transmit from the client to the server under transmitting commands of the system processor, a first message comprising a client's unique ID;

a receiver cooperating with the system processor to receive the first message under receiving commands of the system processor and equipped with a matching engine to match the received client ID with a pre-stored client ID to identify a client;

a session key generator configured to generate a uniquely time bound session key and transmit the generated session key under transmitting commands of the system processor, wherein the session key generator comprises a session key timer responsive to commands from the system processor and configured to revoke the generated session key and indicate requirement of a new session establishment on expiration of a session key timer value;

a challenge code generator cooperating with the system processor and configured to receive the session key and, generate under generation commands of the system processor and transmit under transmitting commands of the system processor, a challenge code comprising the first random number generated by the first random number generator and the session key generated by the session key generator;

a first encrypter cooperating with the challenge code generator to receive the generated challenge code and encrypt in response to the commands from the system processor, the received generated challenge code with the secret key generated by the secret key generator and further configured to transmit under transmitting commands of the system processor, the encrypted challenge code to the identified client;

a first decrypter cooperating with the system processor and configured to receive the encrypted challenge code and further configured to decrypt in response to the commands from the system processor, the encrypted challenge code with the secret key generated by the secret key generator to obtain decrypted first random number and session key;

a repository configured to receive and store the session key from the first decrypter;

a second encrypter cooperating with the system processor and configured to receive the decrypted first random number and session key and, further configured to transmit under transmitting commands of the system processor, a second message containing the decrypted first random number and the second random number generated by the second random number generator encrypted with the session key;

a second decrypter cooperating with the system processor and configured to receive the second message and further configured to decrypt in response to the commands from the system processor, the first random number and the second random number using the session key generated by the session key generator;

a first comparator and authenticator configured to compare in response to the commands from the system processor, the decrypted first random number from the second message with the first random number generated by the first random number generator thereby authenticating the client;

a third encrypter configured, after authenticating the client, to encrypt in response to the commands from the system processor, the second random number received in the second message with the session key generated by the session key generator and transmit under transmitting commands of the system processor, the encrypted second random number;

a third decrypter configured to receive under receiving commands of the system processor, and further configured to decrypt the encrypted second random number with the session key received from the repository in response to the commands from the system processor;

a second comparator and authenticator configured to compare in response to the commands from the system processor, the decrypted second random number with the second random number generated by the second random number generator thereby authenticating the server and achieving mutual authentication; and wherein the first random number generated by the first random number generator comprises a first pseudo random number appended with the first timer value.

2. The system as claimed in claim 1, wherein the first random number generator comprises a first timer responsive to commands from the system processor and configured to generate a first timer value.

3. The system as claimed in claim 1, wherein the second random number generator comprises a second timer responsive to commands from the system processor and configured to generate a second timer value.

4. The system as claimed in claim 1, wherein the second random number generated by the second random number generator comprises a second pseudo random number appended with the second timer value.

5. The system as claimed in claim 1, wherein the secret key generated by the secret key generator is a unique key generated at the start of a session and is valid only during the ongoing session.

6. The system as claimed in claim 1, wherein the random numbers generated by the first random number generator and the second random number generator are non-reproducible and change over different sessions.

7. The system as claimed in claim 1, wherein the client communicate with the server such that the server does not respond with status of the execution of the client's request.

8. The system as claimed in claim 1, wherein the system is integrated with transport layer security schemes including Datagram Transport Layer Security (DTLS).

9. The system as claimed in claim 8, wherein the system is integrated with application layer protocol including Constrained Application Protocol (CoAP) for constrained devices, wherein session establishment is embedded within the Constrained Application Protocol (CoAP) to reduce the session establishment overhead in the Datagram Transport Layer Security (DTLS).

10. The system as claimed in claim 1, which includes a key refreshment timer for refreshing sessions, wherein said key refreshment timer refreshes each session from the sessions when a key refreshment timer value is greater than the product of a MAX RETRANSMIT COUNT and a MAX RETRANSMISSION TIMEOUT.

11. A computer implemented method for two way authentication on datagram transport between a server and a client, said method including system processing commands and comprising the following steps:
generating a first random number with the help of a first random number generator;
generating a second random number with the help of a second random number generator;
generating a secret key in response to the system processing commands with the help of a secret key generator;
transmitting in response to the system processing commands, the generated secret key to the server and the client prior to two way authentication during a provisioning phase;
transmitting in response to the system processing commands, a first message comprising client's unique ID;
receiving in response to the system processing commands, the first message and matching the received client ID with a pre-stored client ID;
identifying the client based on the received client ID;
generating a uniquely time bound session key with the help of a session key generator, which further includes revoking the session key based on expiration of a session key timer value and indicating the requirement of a new session establishment on expiration;
receiving the session key and generating under the system processing commands, a challenge code comprising the first random number generated by the first random number generator and the session key generated by the session key generator;
receiving the generated challenge code from the challenge code generator and encrypting in response to the system processing commands with the help of a first encrypter the received generated challenge code with the secret key generated by the secret key generator and transmitting in response to the system processing commands, the encrypted challenge code;
receiving the encrypted challenge code and decrypting in response to the system processing commands, the encrypted challenge code with the secret key generated by the secret key generator with the help of a first decrypter to obtain the first random number and the session key;
receiving from the first decrypter the session key and storing in a repository;
receiving in response to the system processing commands, the decrypted first random number and session key and transmitting a second message encrypted with the session key containing the decrypted first random number and the second random number generated by the second random number generator;
receiving in response to the system processing commands, the second message and decrypting the first random number and the second random number using the session key generated by the session key generator;
comparing in response to the system processing commands, the decrypted first random number from the second message with the first random number generated by the first random number generator;
authenticating under the system processing commands, the client if the decrypted first random number matches with the generated first random number;
encrypting, after authenticating the client, in response to the system processing commands, the second random number received in the second message with the session key generated by the session key generator and transmitting the encrypted second random number;
receiving and decrypting in response to the system processing commands, the encrypted second random number with the session key received from the repository;
comparing the decrypted second random number with the second random number generated by the second random number generator in response to the system processing commands; and
authenticating the server in response to the system processing commands, to achieve mutual authentication if the decrypted second random number matches with the generated second random number; and
wherein the first random number generated by the first random number generator comprises a first pseudo random number appended with a first timer value.

12. The method as claimed in claim 11, wherein the step of generating the second random number comprises a step of generating in response to the system processing commands, a second timer value and appending it to a second pseudo random number to generate the second random number.

13. The method as claimed in claim 11, wherein the step of generating the secret key involves generation of a unique key at the start of a session which is valid only during the ongoing session.

14. The method as claimed in claim 11, wherein the steps of generating random numbers involve generating numbers in response to the system processing commands, that are non-reproducible and those that change over different sessions.

15. The method as claimed in claim 11, wherein the client communicate with the server such that the server does not respond with status of the execution of the client's request.

16. The method as claimed in claim 11, wherein the method is integrated with transport layer security schemes including Datagram Transport Layer Security (DTLS).

17. The method as claimed in claim 16, wherein the method is integrated with application layer protocol including Constrained Application Protocol (CoAP) for constrained devices, wherein session establishment is embedded within the Constrained Application Protocol (CoAP) to reduce the session establishment overhead in the Datagram Transport Layer Security (DTLS).

18. The method as claimed in claim 11, which includes a step of refreshing sessions, by a key refreshment timer, wherein said step of refreshing each session from the sessions when a key refreshment timer value is greater than the product of a MAX RETRANSMIT COUNT and a MAX RETRANSMISSION TIMEOUT.

* * * * *